United States Patent [19]

Kaya

[11] Patent Number: 5,472,257
[45] Date of Patent: Dec. 5, 1995

[54] VEHICLE PROTECTIVE COVER

[76] Inventor: Flint F. Kaya, 7 Pilgrim, Aylmer, Quebec, Canada, J9H 3T1

[21] Appl. No.: 417,124

[22] Filed: Apr. 5, 1995

Related U.S. Application Data

[63] Continuation-in-part of Ser. No. 62,226, May 18, 1993, abandoned.

[51] Int. Cl.$^6$ .................................................. B60J 11/00
[52] U.S. Cl. ........................ 296/136; 150/166; 160/84.02
[58] Field of Search ............................ 296/98, 100, 136; 150/166; 160/35, 84.01, 84.02, 84.04, 370.21, 370.22, 370.23

[56] References Cited

U.S. PATENT DOCUMENTS

| | | | |
|---|---|---|---|
| 3,021,894 | 2/1962 | La Due | 296/136 X |
| 3,656,802 | 4/1972 | White | 296/100 |
| 4,657,298 | 4/1987 | Yong O | 296/136 |
| 5,056,839 | 10/1991 | Yoon | 296/136 X |
| 5,067,541 | 11/1991 | Coslett | 160/84.04 |

FOREIGN PATENT DOCUMENTS

1074987  4/1954  France ................................. 296/136

*Primary Examiner*—Andrew C. Pike
*Attorney, Agent, or Firm*—Adrian Zahl

[57] ABSTRACT

A protective cover for a vehicle comprises a flexible sheet retractible into a case mountable to a first end of a vehicle. The cover includes a flexible sheet having an array of cords extending longitudinally along the sheet, each cord being fixed at a distal end to the sheet. The cords comprise side cords extending the length of the sheet along its respective sides and one or more intermediate-length cords attached to the sheet partway between its respective ends. The cords are retractible into the case by a retraction device that retract the respective cords at rates proportional to their lengths, to permit the simultaneous retraction of the cords into the case. The side cords permit the sheet to be cinched down over and partly under and end of the vehicle. The case may comprise a compartment incorporated into the vehicle, or it may be separately mounted to the vehicle. The invention further comprises a vehicle having a case for a cover as defined herein incorporated therein.

14 Claims, 6 Drawing Sheets

VEHICLE PROTECTIVE COVER

The present application is a continuation-in-part of application Ser. No. 08/062,226, filed on May 18, 1993, now abandoned.

FIELD OF THE INVENTION

The present invention relates to a retractable cover for use with an automobile or other vehicle. The cover may be positioned over the vehicle to protect it against sun, snow, or ice, and may be retracted into a case when not in use. The case may be either mounted to the vehicle or incorporated therein.

BACKGROUND OF THE INVENTION

Protective covers and tarps are well known for many uses, including the covering of vehicles. The most widely used form of vehicle cover is probably a simple tarp, that may be tailored to fit a particular vehicle. The tarp may be retained on the vehicle by an elasticized skirt that permits the cover to wrap partly under the vehicle. Where a cover is intended for daily use, it is desirable to provide retraction means that retract the cover into a vehicle-mounted compartment. Ideally, the compartment should be relatively compact. The cover should as well be capable of being relatively form-fitting and should retract into the compartment with a minimum of tangling.

The recent development of fabrics woven from Dacron™, Kevlar™, and other strong, thin synthetic fibers has made it possible to provide a thin, light, and flexible cover that may be stored within a relatively small case. These materials also tend to repel ice and snow, resist rot and mildew, and retain little moisture.

Various retractable vehicle covers that retract the cover into a vehicle-mounted case, are known. For example, U.S. Pat. No. 4,657,298 (Yong O) discloses a cover comprising a flexible membrane, retractable into a case recessed into the trunk of an automobile. The case is provided with a motor-driven roller which winds up the membrane. Similar covers are disclosed in U.S. Pat. Nos. 5,056,839 (Yoon) and 3,021,894 (La Due). These existing retractable covers operate well only if the cover comprises a generally flat sheet, since any fitting or forming of the sheet to allow it to cover the sides of the vehicle would tend to result in billowing, tangling, or uneven rolling as the cover is retracted. The use of a roller as the retraction means can cause particular difficulties: the cover can become unevenly rolled up about a roller-type retraction means and slip partly off the end of the roller. As well, the roller should extend the full width of the cover, and this may be impractical in many vehicles.

These drawbacks may be alleviated by the use of a cover provided with retraction means that allow the cover to be bunched, rather than rolled, into a compartment or case. These retraction means typically comprise one or more cords that extend longitudinally along the cover. The cords are retracted by cord retraction means, drawing the cover into a case. In prior art devices, the cords all extend the full length of the cover, and are engaged at their distal ends to a corresponding distal end of the cover. The cords may be slideably engaged to the cover between their distal and proximal ends, for example by threading the cords through sleeves or grommet arrangements. For example, U.S. Pat. No. 5,067,541 (Coslett) discloses the use of a pleated cover, having cords extending along the side edges of the cover in a manner similar to a pleated window shade. Retraction of the cords causes the cover to be folded into a compartment. Similarly, U.S. Pat. No. 3,656,802 (White) discloses a cover intended to cover the bed of a dump truck, which consists of a sheet having cords threaded through grommets within the cover. Retraction of the cords causes the cover to be bunched into an open-top container positioned over the cab of the truck.

These existing cord-driven covers suffer several drawbacks, which the present invention has as its objects to address. First, retention to the vehicle may be difficult, since such covers are not provided with means to wrap over and partly under an end of the vehicle, as in the manner of a conventional tarp with an elasticized skirt. Second, since the cords all extend the full length of the cover, billowing of the cover may occur as the cover is retracted. It is desirable to provide intermediate-length cords, which when retracted together with the full-length cords evenly retract the cover with a minimum of billowing. Each intermediate-length cord is attached at its distal end to the cover at a position distant from the distal end of the cover. The intermediate-length cords serve as well to permit the cover to conform more closely to the vehicle when the cover is positioned over the vehicle; this may be accomplished by partially retracting the intermediate-length cords after the cover is fixed over the vehicle.

These drawbacks may be addressed by the provision of a cover adapted to wrap over and partly under an end of a vehicle, and having side cords that permit the cover to be cinched around the end of the vehicle when the cords are partly retracted. As well, the use of intermediate-length cords that extend but partway up the cover permits the cover to conform relatively closely to the shape of the vehicle, while permitting the cover to be evenly retracted with a minimum of billowing.

The full length and intermediate length cords must be retracted at different rates, in order to permit them to be fully retracted simultaneously.

The term "longitudinal" as used herein refers to the longitudinal axis of the vehicle and the cover when positioned on the vehicle. The terms "proximal" and "distal" refer to the directions towards and away from the retraction means, respectively. The term "cord means" refers to cords, chains, cables, tape, and the like, any of which may be incorporated into the present invention with suitable adaptation.

SUMMARY OF THE INVENTION

In light of the objects stated above, the present invention comprises a protective cover for a vehicle, comprising:

1) a flexible generally elongate sheet adapted to be drawn over and at least partly cover a vehicle, with an end of the sheet extending over and partly under a corresponding end of the vehicle. The sheet is defined by sides and proximal and distal ends;

2) an array of cord means extending longitudinally along the sheet. Each of the cord means has a distal end and a proximal end, with the distal end being fixedly attached to the sheet. The array of cord means includes side cord means extending along the side edges of the sheet and attached to the distal end of the sheet, adapted to cinch the sheet over and partly under the vehicle when the side cord means are partly retracted. The array further includes intermediate-length cord means attached to the sheet partway between the proximal and distal ends of the sheet; and 3) cover retraction means adapted to be mounted to a vehicle, adjacent an end of the vehicle. The cover retraction means comprises a case and cord retraction means adapted to retract the cord means. As the cords are retracted, the sheet is drawn into the case, with the proximal end of the sheet being drawn in first. In the preferred embodiment, the cord retraction means is located outside the case, such that the sheet and the cords are retained in separate compartments when retracted.

The cord retraction means is adapted to take up the cord means at rates corresponding to their respective lengths, in order that the respective cords may be fully retracted simultaneously.

In its preferred embodiment, the cord retraction means comprises an array of spools mounted to a rotatably-driven shaft. Each spool corresponds to and is adapted to take up an individual cord means. The cord take-up surfaces of the spools are of varying diameters, in order to take up the cords at different rates in relation to their respective lengths.

The invention further comprises a vehicle wherein the case described above comprises a compartment incorporated into the vehicle, adapted to receive a cover. The cover may be provided with a cord arrangement, with the compartment provided with retraction means, as described above.

While in the preferred embodiment the device is shown installed on a sedan-type automobile, it will be seen that the present invention may with minor modifications be adapted for use with any type of vehicle.

DETAILED DESCRIPTION OF THE PREFERRED EMBODIMENTS

Figure 1:
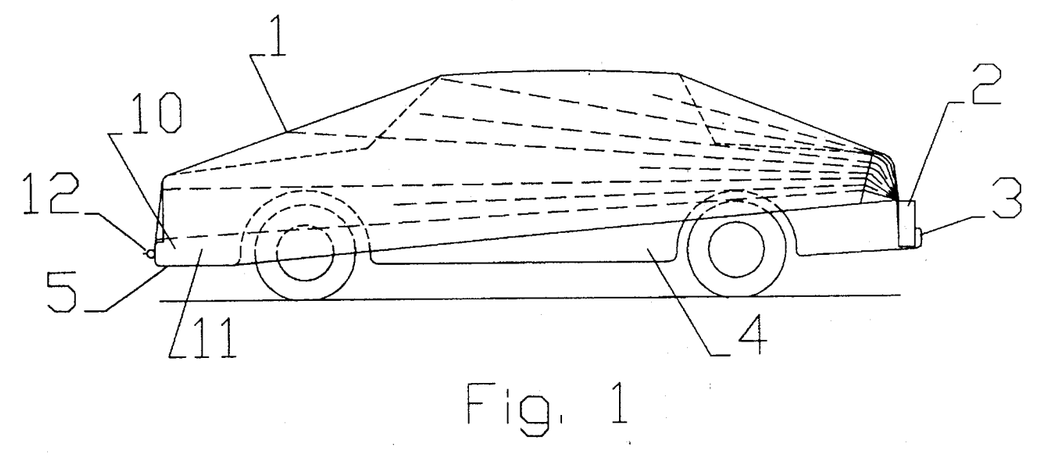
FIG. 1 is a side view of a protective cover positioned on a vehicle.
Figure 2:
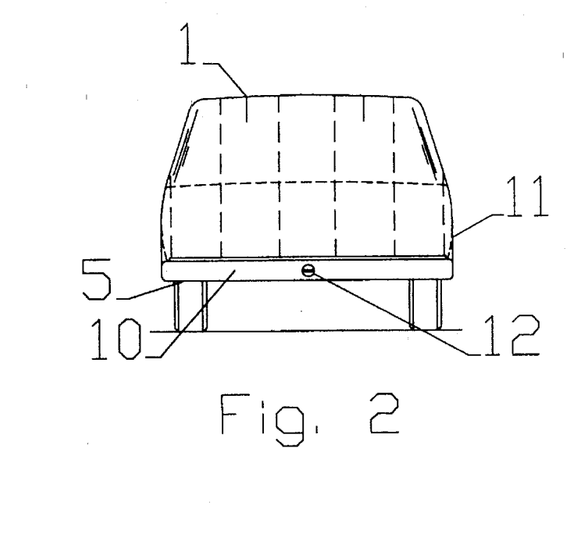
FIG. 2 is a front view of the cover positioned on a vehicle.
Figure 3:
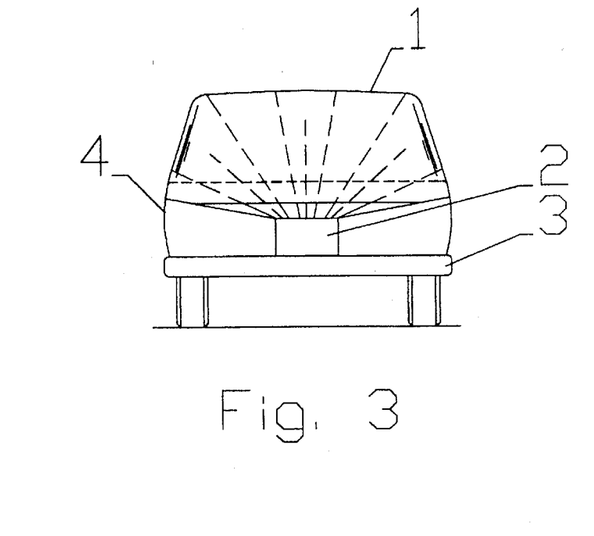
FIG. 3 is a rear view of the cover positioned on a vehicle.
Figure 4:
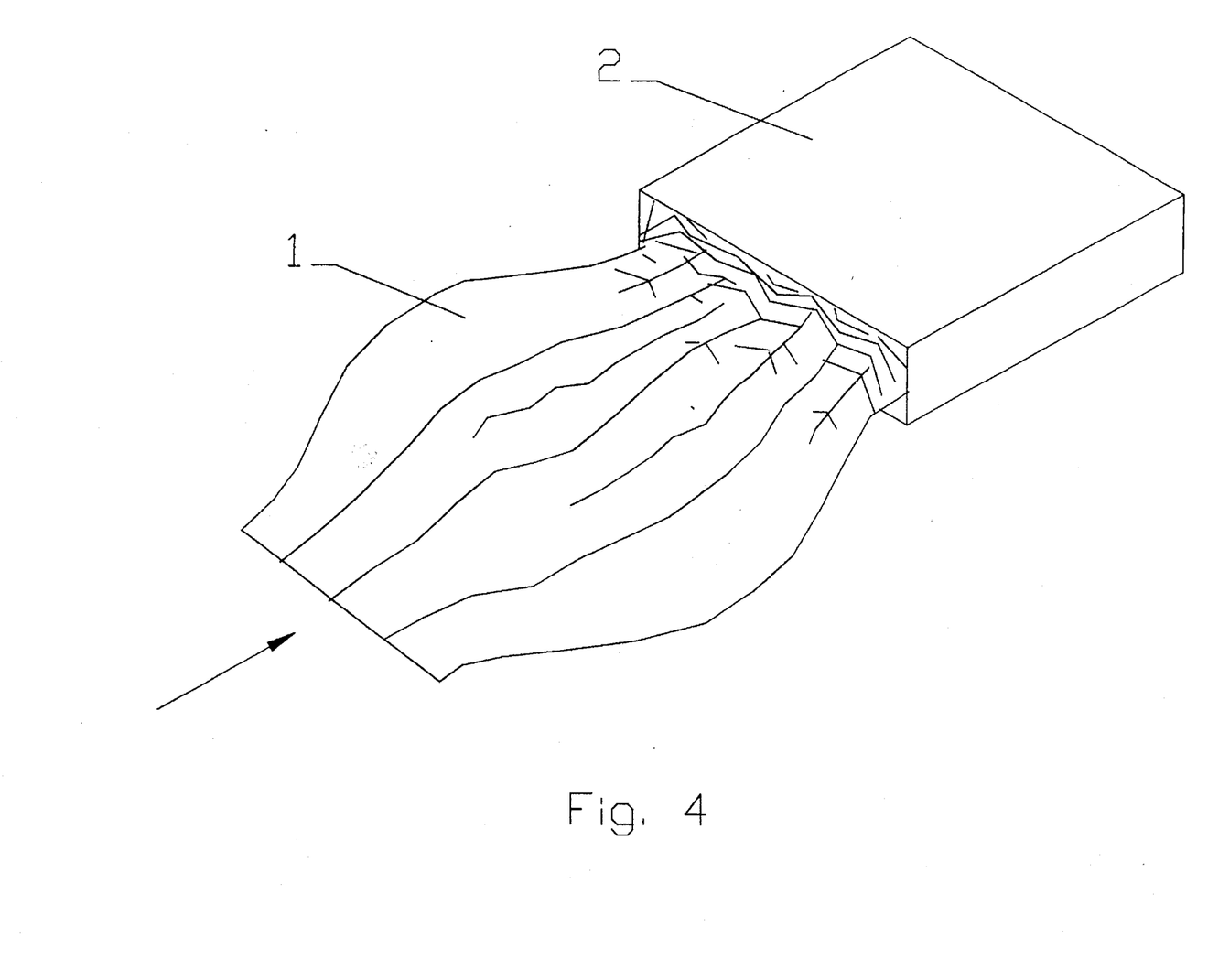
FIG. 4 is a perspective view of the case and cover.

The present invention is illustrated in use, positioned on a sedan-type automobile, in FIGS. 1–3. The cover 1 extends forwardly from a case 2 mounted to the rear bumper 3 of the vehicle 4, over the front face of the vehicle. The front edge 5 of the cover may be drawn over and partly under the front bumper 10 and fender 11 of the vehicle, as seen in FIGS. 1 and 2. The cover comprises a sheet of a light, flexible, and thin material such as Dacron™, and is provided with a pull knob 12 adjacent the forward edge 5 thereof. For secure engagement, the pull knob may be attached to a strong fabric web sewn into the cover, not shown. As shown in FIG. 4, an end of the case 2 is open to the interior thereof, for the retraction and extension of the cover into and out of the case.

The cover 1 extends across the upper surface of the vehicle and partway down the sides thereof, conforming generally to the shape of the vehicle.

Figure 5:
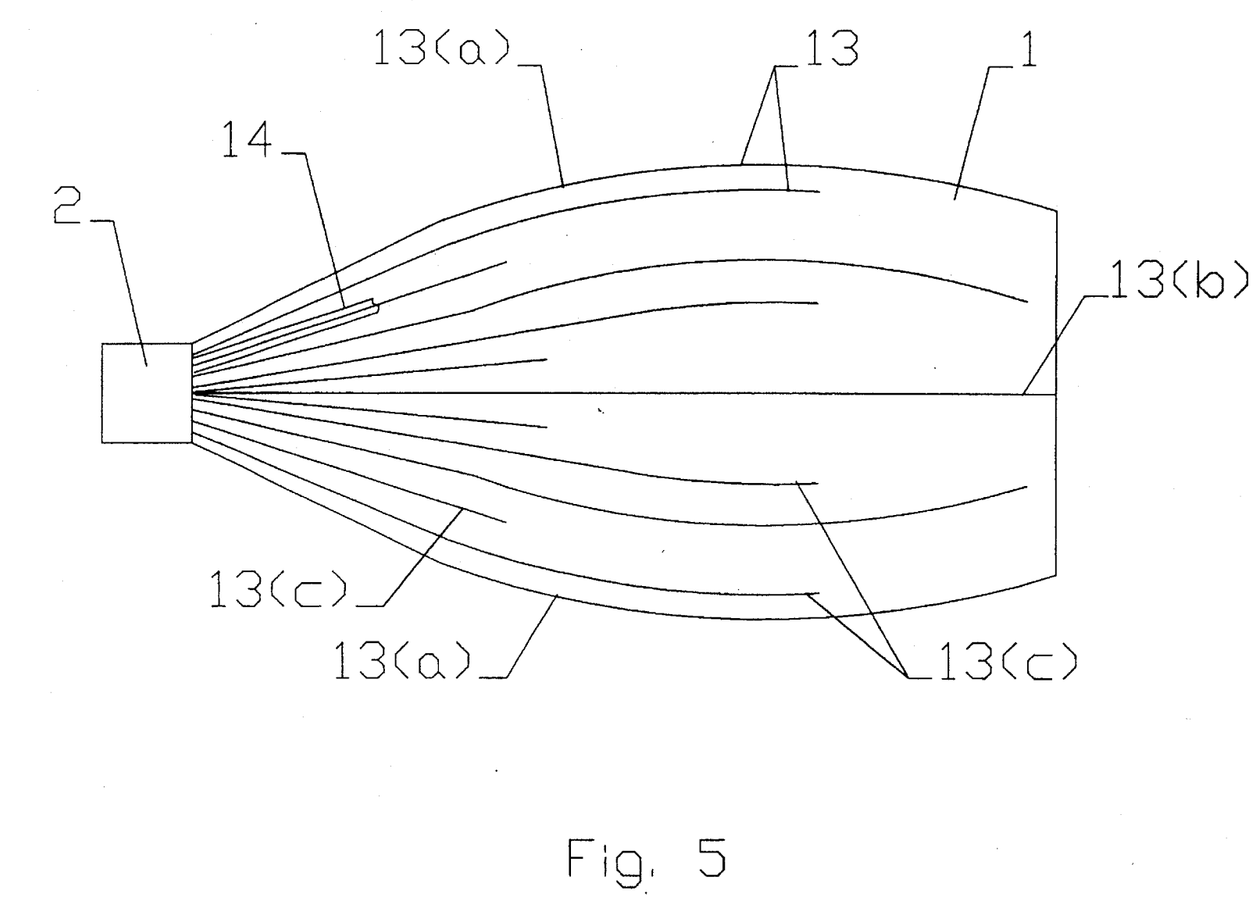
FIG. 5 is a plan view of the case and cover.

Turning to FIG. 5, an array of cords 13 extends longitudinally along the cover. Each cord includes a proximal end linked to the retraction means 20, described below, housed within the case 2, and an opposing distal end. Each cord 13 is threaded through a sleeve 14 within the cover, one of which is shown in FIG. 5, partly cut away. The sleeve 14 alleviates wear on the cover from the rubbing of the cords. Each cord 13 is fixed at a distal end thereof to the cover, with the proximal end of the cord being engaged by the retraction means 20, as described below. The respective cords extend varying lengths along the cover. The side cords 13(a) and a mid-line cord 13(b) extend the full length of the cover, and their distal ends are fixed to the distal end of the cover. The side cords 13(a) extend along the side edges of the cover. Mid-length cords 13(c) extend partway up the cover by varying amounts. When the cover is fitted over the vehicle, the side cords permit the cover to be fitted over and partly under the front end of the vehicle. Partial retraction of the retraction means cinches the cover tightly around and over the front end of the vehicle. The varying-length mid-length cords permit the cover to more closely conform to the shape of the vehicle when the cover is positioned over the vehicle and the cords are partly retracted. As well, the mid-length cords permit the cover to be retracted into the case 2 without excessive billowing of the cover.

The cover is positioned on the vehicle by drawing the cover out from the case, extending it over the top of the vehicle and partly under the front end thereof, and then tensioning the cords 13 by partially retracting them with the retraction means. The tension on the cords causes the cover to conform to the upper portion of the vehicle, and to grippingly engage the front end of the vehicle.

Figure 6:
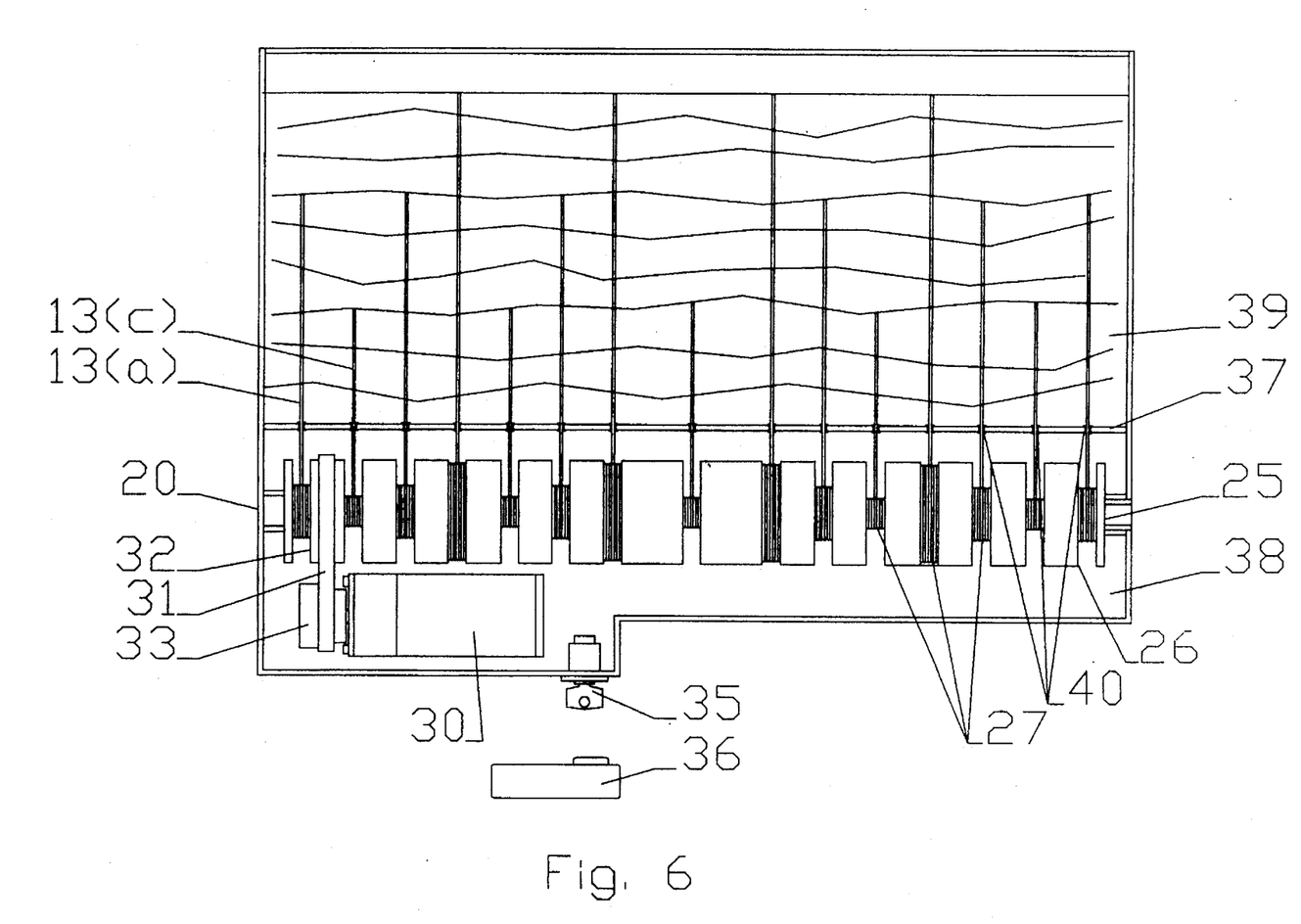
FIG. 6 is a plan view of the case and retraction means of a first embodiment of the invention.
Figure 7:
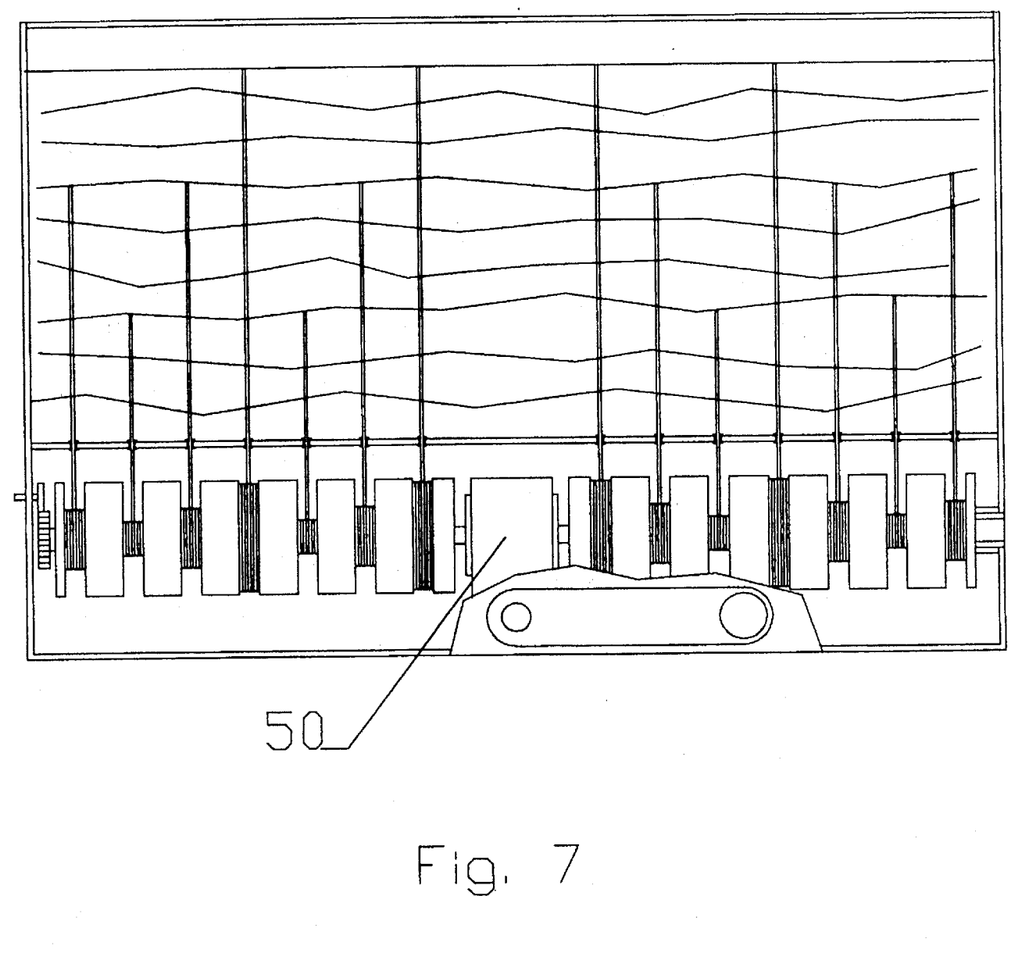
FIG. 7 is a plan view of the case and retraction means of a second embodiment of the invention.

As seen in FIGS. 6 and 7, the proximal ends of each cord extends beyond the rearward edge of the cover and is taken up by the retraction means 20.

Referring to FIG. 6, a first embodiment of the retraction means 20 is shown. The retraction means comprises a central spool shaft 25 journalled within the interior of the case 2 and having spools 26 spaced regularly along the shaft and fixed thereto. The spools are each provided with a cord-receiving surface 27, and are positioned to wind up a corresponding cord 13 about said surface. The diameter of the cord-receiving surfaces 27 varies with the length of the corresponding cord, with the spools corresponding to the shorter cords having smaller-diameter surfaces than those of the longer cords. Thus, the cords are taken up at varying rates proportional to their lengths to permit the cords to be fully retracted generally simultaneously. The spools are sized to permit the retraction means to retract all of the cords such that their distal ends are drawn towards the retraction means at generally the same time. This permits the cover to be retracted evenly towards the retraction means.

The shaft 25 is driven by a motor 30 housed within the case 2. The motor 30 is linked to the shaft by drive belt 31, acting through pulley 32 mounted to the shaft 25 and pulley 33 mounted to the drive shaft, not shown, of the motor. A clutch mechanism interposed between the drive shaft of the motor and the pulley 33 permits the shaft to rotate only when it is retracting the cover; when the cover is fully retracted and the shaft encounters resistance, it will not rotate.

The motor 30 may be actuated by key control 35 or remote control means 36.

An internal divider 37 extends laterally across the interior of the case, parallel to and spaced apart from the shaft 25 and dividing the interior of the case into first and second compartments 38 and 39. The first compartment houses the retraction means 20, and the second compartment receives the cover 1. An array of apertures 40 extends through the divider, through which the cords 13 pass. The cover enters and exits the second compartment through an access slot, seen in FIG. 4. The cover is prevented from being wholly withdrawn into the second compartment by the pull knob 12, which is too large to pass through the access slot and remains outside the case to allow the user to grip the cover.

Retraction of the cover into the case is effected by rotating the shaft 25, causing the cords 13 to be taken up by the spools 26, and the cover 1 being drawn into the second compartment 39. The cover will bunch along naturally-forming pleat lines as it is retracted. Since the mid-length cords are retracted at a slower speed than the full-length cords. The distal end of the cover is drawn towards the case at a faster rate than the middle portion of the cover. By this means, billowing of the cover is minimized as the cover is retracted.

The cover is extracted from the case for positioning on the vehicle by the user grasping the pull knob and pulling the cover out of the case and over the vehicle.

Referring to FIG. 7, a second embodiment of the invention is illustrated, wherein the belt linkage between the motor and the shaft is replaced by a direct drive gearmotor 50.

It will be obvious that the central shaft may be driven by any form of drive means, whether manually or power-driven.

Figure 8:
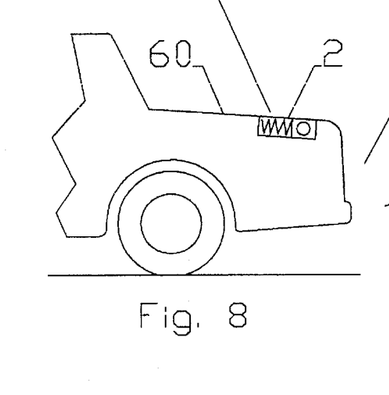
FIG. 8 is side view, partly in section, of a portion of a vehicle, with the cover case installed within the trunk of the vehicle.
Figure 9:
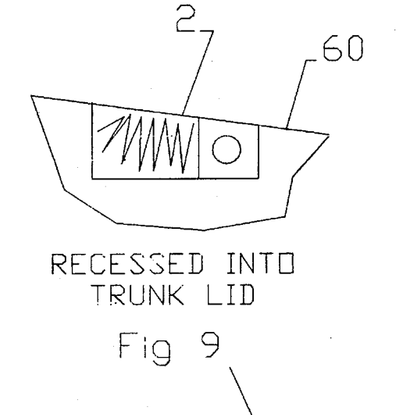
FIG. 9 is a view of a portion of FIG. 8.
Figure 10:
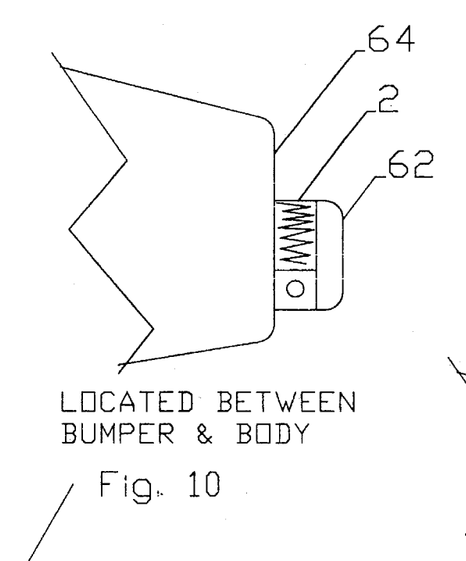
FIG. 10 is a view as in FIG. 9, showing a third embodiment of the invention.
Figure 11:
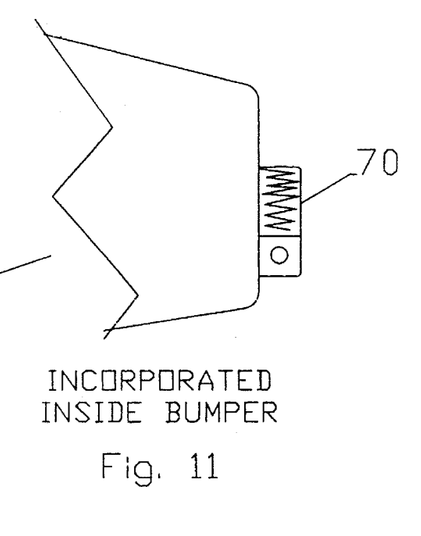
FIG. 11 is a view as in FIG. 9, showing a fourth embodiment of the invention.

The case 2 may be positioned in various positions within or upon the vehicle, as shown in FIGS. 8–11. The case may comprise a compartment recessed into the trunk of a sedan-type vehicle, as shown in FIGS. 8 and 9. In this embodiment, the trunk lid 60 may comprise the upper wall of the case, with the access slot extending through the trunk lid. Alternatively, the case may be positioned between the rear bumper 62 and the body 64, as shown in FIG. 10. In this alternative the first and second compartments within the case are vertically oriented, one above the other. In a third alternative, the case is incorporated within the rear bumper 70 of the vehicle, as shown in FIG. 11. In this third alternative, the bumper itself comprises the case of the device. It will be apparent that the case may be positioned elsewhere about the vehicle, either mounted to a portion of the vehicle or incorporated within the vehicle, and may be positioned either in the front or rear of the vehicle.

Although the present invention has been described in detail by way preferred embodiments thereof, it will be understood by those skilled in the art that variations may be made thereto without departing from the spirit and scope of the invention, as defined in the appended claims.

I claim:

1. A protective cover for a vehicle comprising:

1) a case mountable to said vehicle adjacent one end of said vehicle;

2) a flexible generally elongate sheet having sides and proximal and distal ends, said sheet being extendable from said case over said vehicle with said distal end extending partly under another end of said vehicle;

3) an array of cord means extending longitudinally along said sheet for retracting said sheet into said case, each of said cord means having a distal end and a proximal end and a length therebetween, said distal ends of said cord means being fixedly engaged to said sheet, said array comprising side cord means for causing said sheet to grippingly engage said other end of said vehicle when said sheet is positioned over and partly under said other end of said vehicle and said side cord means are partly retracted, and one or more mid-length cord means for generally evenly retracting said sheet from said vehicle, said side cord means extending along the sides of said sheet and being attached to the distal end of said sheet, said mid-length cord means having the distal ends thereof being attached to said sheet intermediate said proximal and distal ends of said sheet; and 4) cord retraction means mounted within said case and engaged to the proximal ends of each of said cord means for retracting said cord means at rates proportional to the lengths thereof for fully retracting generally simultaneously said cord means to thereby retract said sheet into said case.

2. A protective cover as claimed in claim 1, wherein said cord means are slideably engaged to said sheet intermediate the proximal and distal ends of said cords means.

3. A protective cover as claimed in claim 1, wherein said cord retraction means comprises a shaft rotatably mounted within said case and having an array of spool means thereon for taking up a corresponding one of said cord means, each of said spool means having a cord take-up surface having a diameter dimensioned to correspond with the length of the corresponding cord means for generally simultaneously retracting fully said corresponding ones of said cords means.

4. A protective cover as claimed in claim 1, wherein said case is divided into first and second compartments separated by a divider, said cord retraction means being housed within said first compartment, said second compartment receiving said sheet when the cord means are retracted by the cord retraction means, said divider having at least one aperture therethrough for passage of said cord means for preventing said sheet from being drawn into said first compartment.

5. A protective cover as claimed in claim 1, wherein said case is positionable between a bumper and a body of said vehicle.

6. A protective cover as claimed in claim 1, wherein said case is positionable within a recess in a trunk lid of said vehicle.

7. A protective cover as claimed in claim 1, wherein said case is positionable within a bumper of said vehicle.

8. A vehicle having a protective cover incorporated therein, said protective cover comprising:

1) a case mounted to said vehicle adjacent one end of said vehicle;

2) a flexible generally elongate sheet having sides and proximal and distal ends, said sheet being extendable from said case over said vehicle with said distal end extending partly under another end of said vehicle;

3) an array of cord means extending longitudinally along said sheet for retracting said sheet into said case, each of said cord means having a distal end and a proximal end and a length therebetween, said distal ends of said cord means being fixedly engaged to said sheet, said array comprising side cord means for causing said sheet to grippingly engage said other end of said vehicle when said sheet is positioned over and partly under said other end of said vehicle and said side cord means are partly retracted, and one or more mid-length cord means for generally evenly retracting said sheet from said vehicle, said side cord means extending along the sides of said sheet and being attached to the distal end of said sheet, said mid-length cord means having the distal ends thereof being attached to said sheet intermediate said proximal and distal ends of said sheet; and 4) cord retraction means mounted within said case and engaged to the proximal ends of each of said cord means for retracting said cord means at rates proportional to the lengths thereof for fully retracting generally simultaneously said cord means to thereby retract said sheet into said case.

9. A vehicle as claimed in claim 8, wherein said cord means are slideably engaged to said sheet intermediate the proximal and distal ends of said cords means.

10. A vehicle as claimed in claim 8, wherein said cord retraction means comprises a shaft rotatably mounted within said case and having an array of spool means thereon for taking up a corresponding one of said cord means, each of said spool means having a cord take-up surface having a diameter dimensioned to correspond with the length of the corresponding cord means for generally simultaneously retracting fully said corresponding ones of said cords means.

11. A vehicle as claimed in claim 8, wherein said case is divided into first and second compartments separated by a divider, said cord retraction means being housed within said first compartment, said second compartment receiving said sheet when the cord means are retracted by the cord retraction means, said divider having at least one aperture therethrough for passage of said cord means for preventing said sheet from being drawn into said first compartment.

12. A vehicle as claimed in claim 8 wherein said case is positioned between a bumper and a body of said vehicle.

13. A vehicle as claimed in claim 8, wherein said case is recessed into a trunk lid of said vehicle.

14. A vehicle as claimed in claim 8, wherein said case is incorporated within a bumper of said vehicle.

\* \* \* \* \*